US010035087B2

(12) United States Patent
Vercammen

(10) Patent No.: US 10,035,087 B2
(45) Date of Patent: *Jul. 31, 2018

(54) KEYED THREAD ENGAGEMENT FOR FILTER ELEMENT

(71) Applicant: Parker-Hannifin Corporation, Cleveland, OH (US)

(72) Inventor: Michael Vercammen, Turlock, CA (US)

(73) Assignee: Parker Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,579

(22) Filed: Oct. 4, 2016

(65) Prior Publication Data
US 2018/0085689 A1    Mar. 29, 2018

Related U.S. Application Data

(63) Continuation of application No. PCT/US2014/033173, filed on Apr. 7, 2014.
(Continued)

(51) Int. Cl.
*B01D 29/96*    (2006.01)

(52) U.S. Cl.
CPC ........ *B01D 29/96* (2013.01); *B01D 2201/291* (2013.01); *B01D 2201/34* (2013.01);
(Continued)

(58) Field of Classification Search
CPC ................ B01D 29/96; B01D 2201/34; B01D 2201/291; B01D 2201/4053; B01D 2201/4092
(Continued)

(56) References Cited

U.S. PATENT DOCUMENTS

| 4,052,307 A | 10/1977 | Humbert |
| 4,859,328 A | 8/1989 | Groezinger |

(Continued)

FOREIGN PATENT DOCUMENTS

| EP | 0 532 161 | 3/1993 |
| EP | 0 658 362 | 6/1995 |

(Continued)

OTHER PUBLICATIONS

International Search Report and Written Opinion for corresponding International Patent Application PCT/US2014/033173 dated Dec. 30, 2014.

(Continued)

*Primary Examiner* — Madeline Gonzalez
(74) *Attorney, Agent, or Firm* — Christopher Hunter

(57) ABSTRACT

A filter element includes a ring of filtration media circumscribing a central axis and defining a central cavity. An annular end cap of the filter element is sealingly bonded at an end of the media. The end cap includes a central opening into the central cavity, and a lateral opening spaced laterally outward from the central opening. The central opening includes a threaded connection portion to enable the element to be spun-on to a complimentarily-threaded connection portion of a filter head. The connection portion of the central opening includes at least one axially-extending slot opening radially away from the connection portion.

9 Claims, 9 Drawing Sheets

Related U.S. Application Data

(60) Provisional application No. 61/761,727, filed on Feb. 7, 2013.

(52) U.S. Cl.
CPC ........... *B01D 2201/4053* (2013.01); *B01D 2201/4092* (2013.01)

(58) Field of Classification Search
USPC ....... 210/506, DIG. 17, 167.01, 167.02, 443, 210/444, 440
See application file for complete search history.

(56) References Cited

U.S. PATENT DOCUMENTS

| | | | |
|---|---|---|---|
| 5,035,797 | A | 7/1991 | Janik |
| 5,322,624 | A | 6/1994 | Rogers |
| 9,446,333 | B2 * | 9/2016 | Vercammen ........... B01D 27/08 |
| 2009/0008317 | A1 * | 1/2009 | Mules .................... B01D 27/08 210/233 |
| 2011/0132829 | A1 | 6/2011 | Tucker |
| 2013/0056409 | A1 | 3/2013 | Sawant |
| 2014/0217001 | A1 * | 8/2014 | Vercammen ........... B01D 27/08 210/232 |

FOREIGN PATENT DOCUMENTS

| | | |
|---|---|---|
| EP | 1 070 530 | 5/2004 |
| EP | 2 108 424 | 10/2009 |
| EP | 2 764 901 | 8/2014 |
| GB | 1 450 038 | 9/1976 |
| JP | 09-267005 | 10/1997 |
| WO | 2008118939 | 10/2008 |

OTHER PUBLICATIONS

European Search Report for corresponding European Patent Application No. 14154186.2-1356 dated Apr. 28, 2014.
Non-final Office Action for U.S. Appl. No. 14/175,799 dated Apr. 7, 2016.

* cited by examiner

KEYED THREAD ENGAGEMENT FOR FILTER ELEMENT

FIELD OF INVENTION

The present invention relates generally to filter cartridges, and more particularly to spin-on filter cartridges.

BACKGROUND

Filter cartridges are designed to remove contaminants from various fluids including fuel, engine oil, transmission oil, lubricating oil, or hydraulic oil. In a fuel-delivery system, for example, a filter cartridge filters the fuel upstream of the engine to avoid the ill effects of water and/or contamination. Oil filters are used in many different types of hydraulic machinery, various other vehicle hydraulic systems, internal-combustion engines, and gas turbine engines. An often preferred filter construction incorporates a "spin-on" filter cartridge that can be easily installed in tight spaces (e.g., a crowded engine compartment). With spin-on installation, connections are made, and seals are formed, by the simple act of spinning the filter cartridge onto a threaded mounting stud.

SUMMARY OF INVENTION

It can be important to provide the correct filter type in each application, and, therefore, presented is a filter head and corresponding filter cartridge that can prevent the wrong filter from being spun-on by providing a keyed fit. One or more studs positioned in front of threads on the filter head can fit in corresponding slots or grooves in the threading of the filter element. Once pushed past the studs, the filter element can be spun-on as usual. Further, such a system can prevent accidental filter drops if the threads are "missed" during a first turn or after threads are disengaged during filter removal. If the threads are not engaged and the installer drops the filter element, the filter element may still be held on the filter head because the threading on the filter element will be caught by the studs on the filter head that are no longer aligned with the slots of the filter element. Finally, this system can be used to align the threads of the filter element with the threads of the filter head by determining their initial relative positions based on the positions of the studs and slots, thus easing installation of the filter element.

Therefore, according to one aspect of the invention, a filter element includes a ring of filtration media circumscribing a central axis and defining a central cavity; and an annular end cap sealingly bonded at an end of the media, the end cap including a central opening into the central cavity, and a lateral opening spaced laterally outward from the central opening, the central opening including a threaded connection portion to enable the element to be spun-on to a complimentarily-threaded connection portion of a filter head, the connection portion of the central opening including at least one axially-extending slot opening radially away from the connection portion.

Optionally, the at least one axially-extending slot extends from an axially-outer end of the connection portion to an axially-inner end of the connection portion.

Optionally, the at least one axially-extending slot is at least two axially-extending slots circumferentially spaced around the connection portion.

Optionally, the at least two axially-extending slots are equally spaced.

Optionally, the connection portion faces radially inward.

Optionally, the at least one axially-extending slot is as radially deep as a maximum depth of threads on the connection portion.

Optionally, the at least one axially-extending slot extends from an axially-outer end of the central opening to an axially-inner end of the central opening.

Optionally, the at least one axially-extending slot is four axially-extending slots circumferentially spaced around the connection portion.

Optionally, the four axially-extending slots are equally spaced.

Optionally, the at least one axially-extending slot extends in a circumferential direction, thereby forming at least a portion of a helix.

Optionally, the at least one axially-extending slot includes an axially-extending portion and a circumferentially extending portion.

Optionally, the at least one axially-extending slot includes a second axially-extending portion extending from the circumferentially extending portion, thereby forming a stepped transition.

According to another aspect of the invention, a filter element includes a ring of filtration media circumscribing a central axis and defining a central cavity; and an annular end cap sealingly bonded at an end of the media, the end cap including a central opening into the central cavity, and a lateral opening spaced laterally outward from the central opening, the central opening including a radially-facing circumferentially-extending first flat portion, and a first threaded portion extending circumferentially from the first flat portion to enable the element to be spun-on to a complimentarily-threaded portion of a filter head.

Optionally, the first flat portion extends from an axially-outer end of the first threaded portion to an axially-inner end of the first threaded portion.

Optionally, the filter element further includes a second flat portion extending circumferentially away from a circumferential end of the first threaded portion distal the first flat portion, and a second threaded portion extending circumferentially away from a circumferential end of the second flat portion distal the first threaded portion.

Optionally, the first and second threaded portions have equal circumferential extents.

Optionally, the flat portion and threaded portion face radially inward.

Optionally, a maximum thread depth of the threaded portion aligns with the first flat portion.

Optionally, the first flat portion extends from an axially-outer end of the central opening to an axially-inner end of the central opening.

Optionally, the filter element further includes second, third, and fourth flat portions circumferentially spaced around the central opening, and second, third, and fourth threaded portions circumferentially spaced around the central opening and respectively disposed between respective flat portions.

Optionally, the flat portions are equally spaced.

Optionally, the threaded portions are equally spaced.

Optionally, the at least one axially-extending slot extends in a circumferential direction, thereby forming at least a portion of a helix.

Optionally, the at least one axially-extending slot includes an axially-extending portion and a circumferentially extending portion.

Optionally, the at least one axially-extending slot includes a second axially-extending portion extending from the circumferentially extending portion, thereby forming a stepped transition.

According to another aspect of the invention, a filter assembly includes a filter head having an annular threaded connection portion, defining a connection axis, to enable a filter element having a complimentarily-threaded connection portion to be spun-on to the filter head, the connection portion of the filter head including a thread portion and a lock portion axially outward of the thread portion, the lock portion having at least one radially-projecting stud sized so as to interfere with threads of the complimentarily-threaded connection portion of the filter element.

According to another aspect of the invention, a filter head adapter includes an annular body circumscribing a central opening and defining a longitudinal axis, the annular body having a threaded keyed connection portion to enable the adapter to be spun-on to a complimentarily-threaded connection portion of a filter head, the keyed connection portion including at least one axially-extending slot opening radially away from the keyed connection portion, and the annular body having a threaded filter connection portion to enable a complimentarily-threaded filter element to be spun-on to the adapter.

Optionally, the keyed connection portion is axially offset from the filter connection portion.

Optionally, the keyed connection portion is interiorly-threaded.

Optionally, the filter connection portion is exteriorly-threaded.

Optionally, the at least one axially-extending slot extends from an axially-outer end of the keyed connection portion to an axially-inner end of all threads of the keyed connection portion.

Optionally, the at least one axially-extending slot is at least two axially-extending slots circumferentially spaced around the connection portion.

Optionally, the at least two axially-extending slots are equally spaced.

Optionally, the connection portion faces radially inward.

Optionally, the at least one axially-extending slot is radially deeper than a maximum depth of threads on the connection portion.

Optionally, the at least one axially-extending slot is four axially-extending slots circumferentially spaced around the connection portion.

Optionally, the four axially-extending slots are equally spaced.

Optionally, the at least one axially-extending slot extends in a circumferential direction, thereby forming at least a portion of a helix.

Optionally, the at least one axially-extending slot includes an axially-extending portion and a circumferentially extending portion.

Optionally, the at least one axially-extending slot includes a second axially-extending portion extending from the circumferentially extending portion, thereby forming a stepped transition.

The foregoing and other features of the invention are hereinafter described in greater detail with reference to the accompanying drawings.

DETAILED DESCRIPTION

Figure 1:
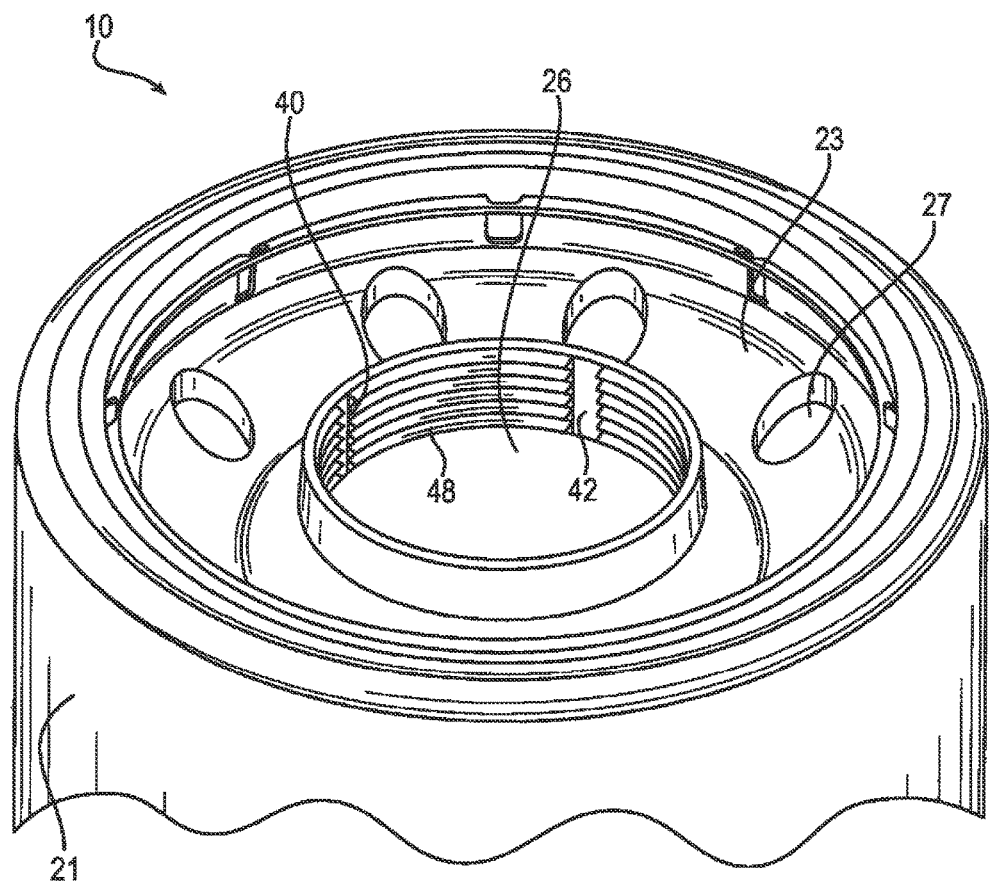
FIG. 1 shows a partial perspective view of an exemplary filter element having a slotted connection portion.
Figure 2:
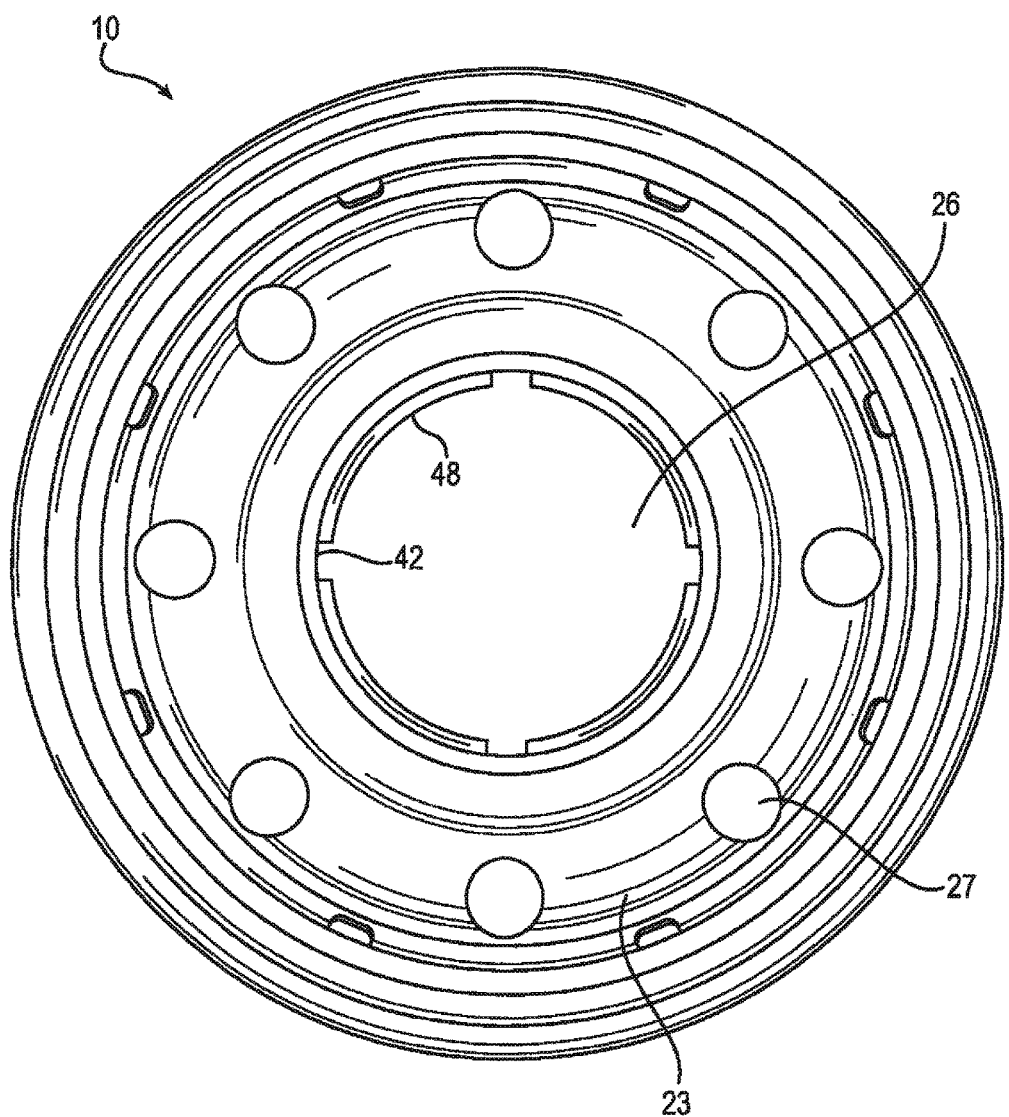
FIG. 2 shows a top view of an exemplary filter element having a slotted connection portion.

In order to ensure the correct filter type is used in each application, to exemplary filter heads can prevent the wrong filter from being spun-on by providing a keyed fit. One or more studs positioned in front of threads on the filter head can fit in corresponding slots or grooves in the threading of exemplary filter elements. Once pushed past the studs, the filter element can be spun-on as usual. Exemplary assemblies can also prevent accidental filter drops if the threads are "missed" during a first turn or after threads are disengaged during filter removal: if the threads are not engaged and the person installing the filter element drops it, the filter element may still be held on the filter head because the threading on the filter element will be caught by the studs on the filter head. Finally, this system can be used to align the threads of the filter element with the threads of the filter head by determining their initial relative positions based on the positions of the studs and slots, thus easing installation of the filter element.

Turning to FIGS. 1-3A, an exemplary filter element is shown at 10 in the form of a filter cartridge. The filter element includes a canister 21 and an end cap 23 enclosing filtration media 22.

The canister 21 may take the form of a generally cylindrical shell with an open end and an opposite closed end. The canister 21 may be constructed, for example, of drawn metal (e.g., steel) and/or it can be formed in one-piece. A rim 31 surrounds the canister's open end and it is shaped to receive the end cap 23 which may, for example, be attached and sealed by a folding operation at the interface between the end cap and the canister. Alternative arrangements known in the art are also possible.

The filtration media 22 may be any suitable filtration media known in the art, and is herein depicted as a cylindrical compilation or ring of longitudinal pleats, for example, and may circumscribe a central axis of the filter element and define a central cavity 25. Further, the filtration media 22 may be spaced from the canister 21 forming an outer chamber 29.

The end cap 23 may be annular and include a central opening 26 into the central cavity. The end cap 23 may also include one or more lateral openings 27 (usually a plurality of equally spaced openings) spaced laterally outward from the central opening. The exemplary embodiment depicted herein includes eight such openings 27 equally spaced around the end cap. The laterally outwardly spaced openings 27 may preferably by inlets to the filter, with the central opening 26 acting as an outlet. However, the opposite arrangement is also possible. As shown, the outer openings 27 are in fluid communication with the outer chamber 29 such that fluid entering the canister would flow into the outer chamber 29, pass through the filtration media into the central cavity 25, and then flow out the central opening 26.

The end cap 23 may include an axially outward facing annular sealing member 32 which seals the filter element to the filter head after it is spun on.

The central opening 26 includes a threaded connection portion 40 to enable the filter element to be spun-on to a complimentarily-threaded connection portion 140 of a filter head 110. The connection portion 40 of the central opening 26 includes at least one axially-extending slot 42 opening radially away from the connection portion. The exemplary filter element is depicted as having four such slots 42, but any number of slots may be used.

The slots are essentially radially-facing circumferentially-extending flat portions. Threaded portions 48 extend circumferentially from the flat portions to enable the element to be spun-on to a complimentarily-threaded portion of a filter head. The flat portions or (slots that run through the threads of the connection portion) allow the complimentary studs of the connection portion of the filter head to slide past the threads without interfering with the threads. In other words, the slots or flat portions act as a key to allow the filter element to be spun on to a "locked" filter head.

The slots 42 extend axially all the way through the threads of the connection portion. In exemplary filter elements in which the entire connection portion is threaded or in which the slots are of a depth that is different than the thread depth, the slots 42 may extend from an axially-outer end of the connection portion to an axially-inner end of the connection portion. In a situation in which the slots extend radially deeper than the threads, there may also be a circumferential groove around the axially inner side of the connection portion in order to accommodate the studs of the filter head during spinning of the filter element.

The slots are described as having a "flat" portion. Flat as used herein is meant to encompass any portion that is recessed so as allow the stud to pass through the threads. In particular, such recessed portion or "flat" may be flat in both axial and circumferential directions. Alternatively, this recessed portion may be flat along the axial direction but include a curved circumferential surface that may have the same radius of curvature as the central opening, or a different radius of curvature.

Figure 3A:
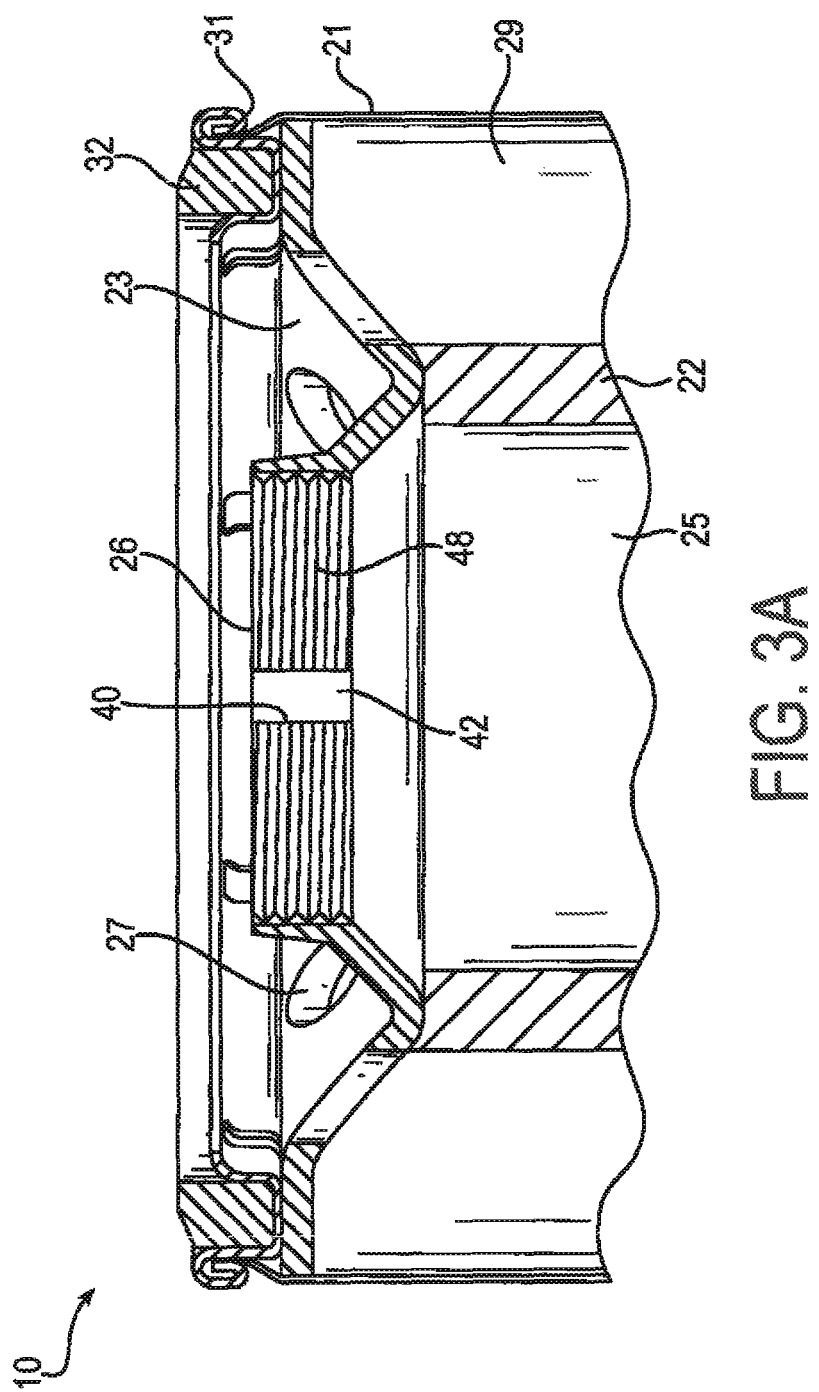
FIG. 3A shows a partial cross-sectional view of an exemplary filter element having a slotted connection portion.
Figure 3B:
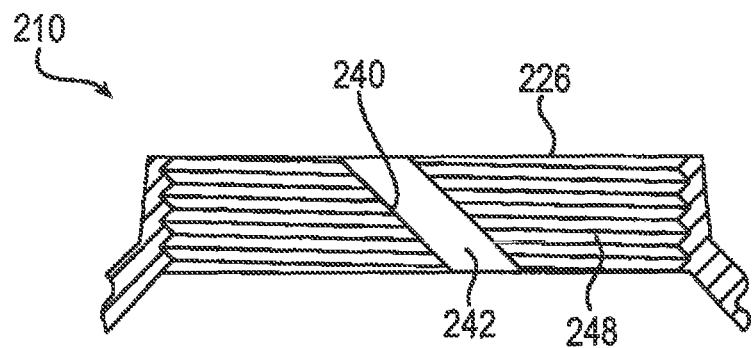
FIG. 3B shows a partial cross-sectional view of another exemplary filter element having a slanted slotted connection portion.

Furthermore, the slots are shown in FIG. 3A as extending in merely an axial direction (although having a circumferential extent). Turning now to FIG. 3B, an exemplary embodiment of the filter element is shown at 210. The filter 210 is substantially the same as the above-referenced filter element 10, and consequently the same reference numerals but indexed by 200 are used to denote structures corresponding to similar structures in the filter element. In addition, the foregoing description of the filter element 10 is equally applicable to the filter element 210 except as noted below. Moreover, it will be appreciated upon reading and understanding the specification that aspects of the filter elements may be substituted for one another or used in conjunction with one another where applicable. In particular, the filter element 210 includes slots 242 which are slanted and thus extend in both an axial and a circumferential direction and therefore form at least a portion of a helix, as shown in FIG. 3B.

Figure 3C:
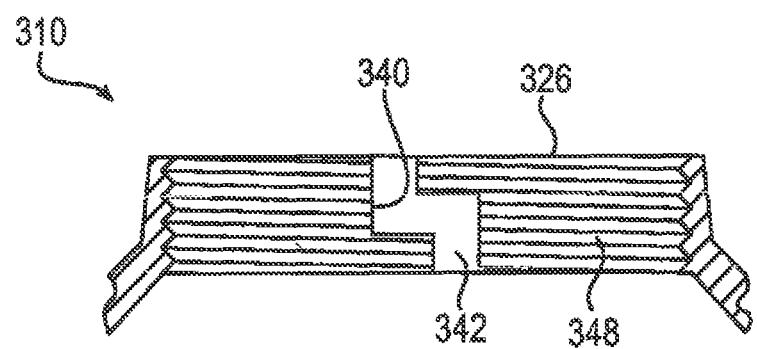
FIG. 3C shows a partial cross-sectional view of another exemplary filter element having a stepped slotted connection portion.

Turning now to FIG. 3C, an exemplary embodiment of the filter element is shown at 310. The filter 310 is substantially the same as the above-referenced filter elements 10 and 210, and consequently the same reference numerals but indexed by 100 are used to denote structures corresponding to similar structures in the filter element. In addition, the foregoing description of the filter elements 10 and 210 are equally applicable to the filter element 310 except as noted below. Moreover, it will be appreciated upon reading and understanding the specification that aspects of the filter elements may be substituted for one another or used in conjunction with one another where applicable. Alternatively or additionally to the slots 42 and 242 described above, the slots 342 may include one or more curved or step transitions, as shown in FIG. 3C, in which a portion extending in either a generally axial or circumferential direction transitions to a portion extending in the opposite direction. Therefore, as shown, slots 342 may include a first axially extending portion 343, a first circumferentially extending portion 345 extending from the first axially extending portion 343, and a second axially extending portion 347 extending from the circumferentially extending portion 345.

It is also contemplated that exemplary slots may transition from extending axially outward to extending axially inward before transitioning back to an axially outward direction. Such a configuration might require an exemplary filter to be pushed in, turned, partially pulled out, turned, and pushed in again before threads may be engaged. These configurations are merely given as examples, and are not meant to be limiting.

The slots 42, 242, 342 may be circumferentially spaced around the connection portion in an equally spaced manner as shown, or in an unequally spaced manner. Unequal spacing may provide for a single "correct" orientation when installing the filter element.

Although shown as facing radially inward, the connection portion (and therefore the threads and the slots) may also face radially outward and mesh with a complimentary connection portion on the filter head.

Figure 4:
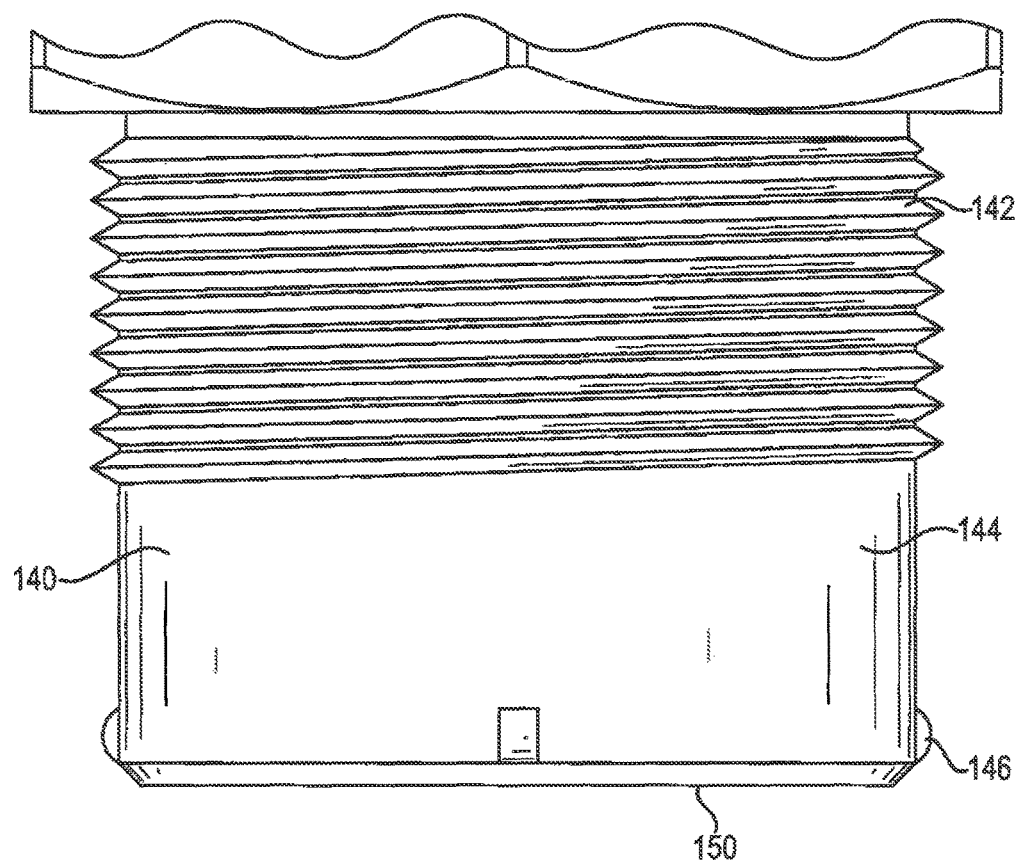
FIG. 4 shows a partial side view of an exemplary filter head having a studded connection portion.

Referring specifically to FIG. 4, shown is a portion of a filter head at 110. The filter head may be any conventional body that accepts spin-on filters such as, e.g., a portion of a manifold, except with the differences described herein. Exemplary filter heads include an annular threaded connection portion 140 that have a thread portion 142 and a lock portion 144. The lock portion 144 extends axially outward (away from the filter head and towards a filter element) from the thread portion and includes one or more studs 146 which project radially away from sidewalls of the lock portion.

As shown in the exemplary embodiment in FIG. 4, the studs may project radially outward, although they may also project radially inward instead. In any case, the studs should be on the same radial side as the threads of the thread portion.

As shown, the stud 146 profile may include rounded axial corners to ease insertion into the slots, however, other profiles are possible. The studs 146 may have a circumferential curve on its radial end to match a corresponding circumferential curve of the flat surface of the slots. Alternatively, the studs 146 may include a flat radial end. Further, other profiles may be provided as, for example, requested by a customer. Further, the stud may extend in an axial and/or circumferential direction, and may extend is a partial or full helical pattern.

Further, any number of studs is possible, with FIG. 4 showing a configuration having 4 equally spaced studs. Studs may be disposed equally spaced or unequally spaced. Unequal spacing may provide a single acceptable orientation of a filter element to be spun-on to the filter head.

The stud(s) 146 should project sufficiently far so as to provide interference to threads on a complimentary filter element. Therefore, in exemplary embodiments, the stud 146 projects as far or farther than the maximum radial extent of the threads of the thread portion 142.

Exemplary connection portions 110 include a central opening 150 and one or more lateral openings (not shown) which fluidly communicate with the respective openings of an attached filter element.

Figure 5:
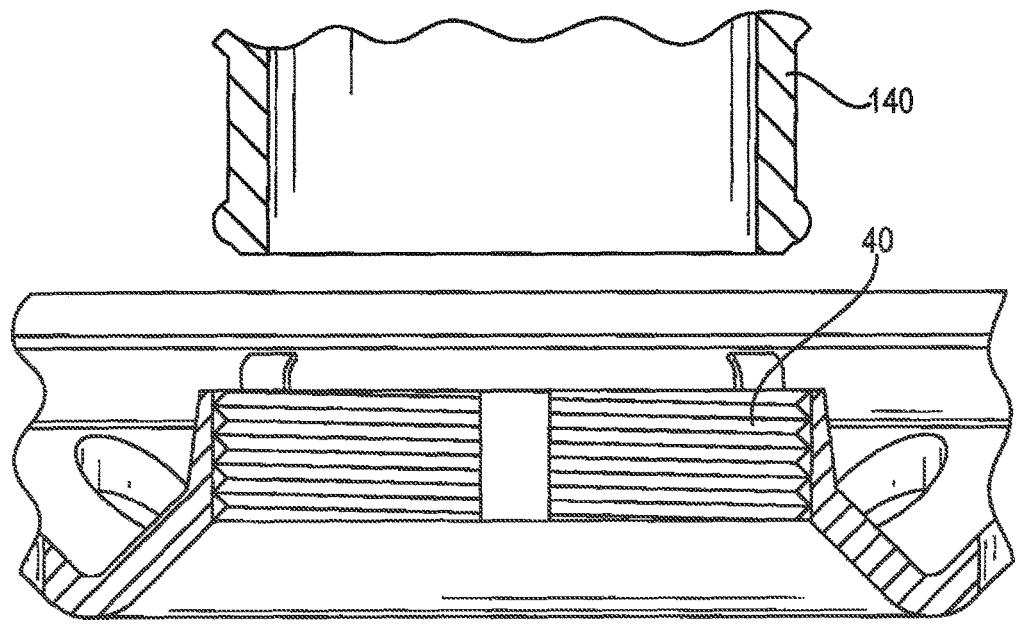
FIG. 5 shows an exemplary connection portion of a filter element aligned with a complimentary connection portion.
Figure 6:
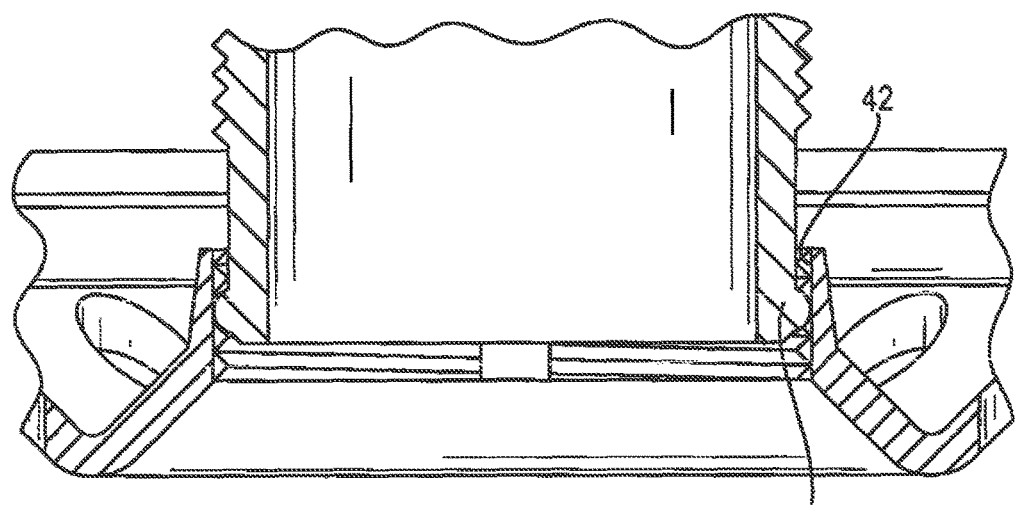
FIG. 6 shows an exemplary connection portion of a filter element aligned with and being inserted over a complimentary connection portion.
Figure 7:
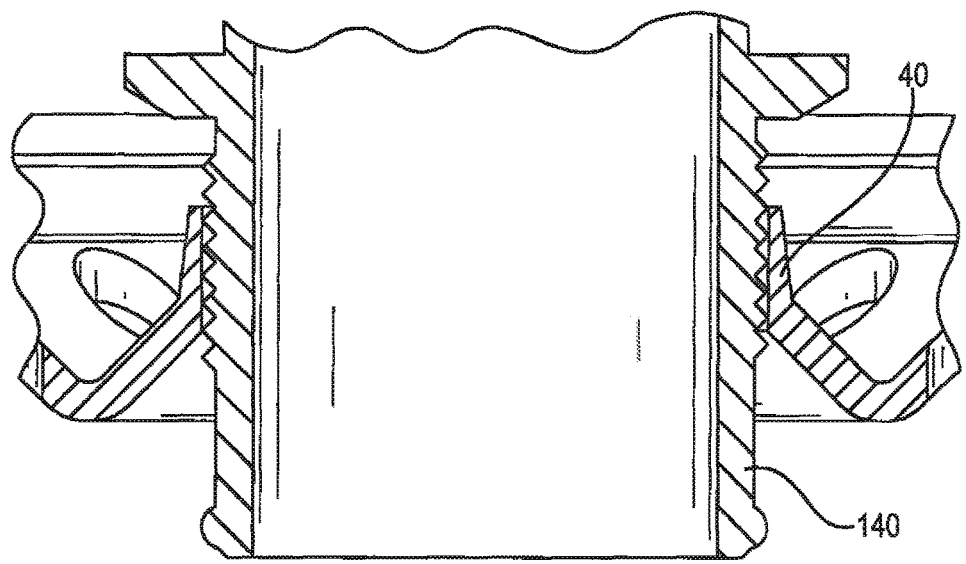
FIG. 7 shows an exemplary connection portion of a filter element having been spun-on to a complimentary connection portion.

Turning now to FIGS. 5-7, shown are a sequence of images showing the attachment of an exemplary filter element to an exemplary filter head.

FIG. 5 shows an exemplary connection portion 40 of a filter element aligned with a complimentary connection portion 140.

FIG. 6 shows an exemplary connection portion 40 of a filter element aligned with and being inserted over a complimentary connection portion 140. In particular, the studs 146 are being inserted through the slots 42.

FIG. 7 shows an exemplary connection portion 40 of a filter element having been spun-on to a complimentary connection portion 140. In other words, the filter element is now threadably engaged with the filter head—the studs 146 having passed through the slots 42 and the respective thread portions being intermeshed with each other after being rotated relative to each other in the engaging (e.g., clockwise) direction after initial thread alignment.

Figure 8:
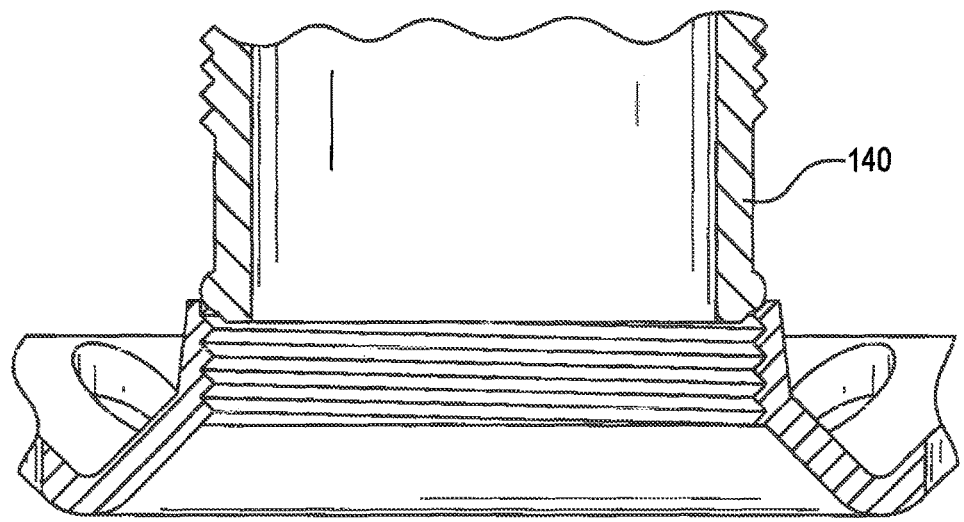
FIG. 8 shows a conventional filter element without slots that cannot accept the studded connection portion of an exemplary filter head.

FIG. 8 shows a conventional filter element without slots 42 that cannot accept the studded connection portion of an exemplary filter head.

Figure 9:
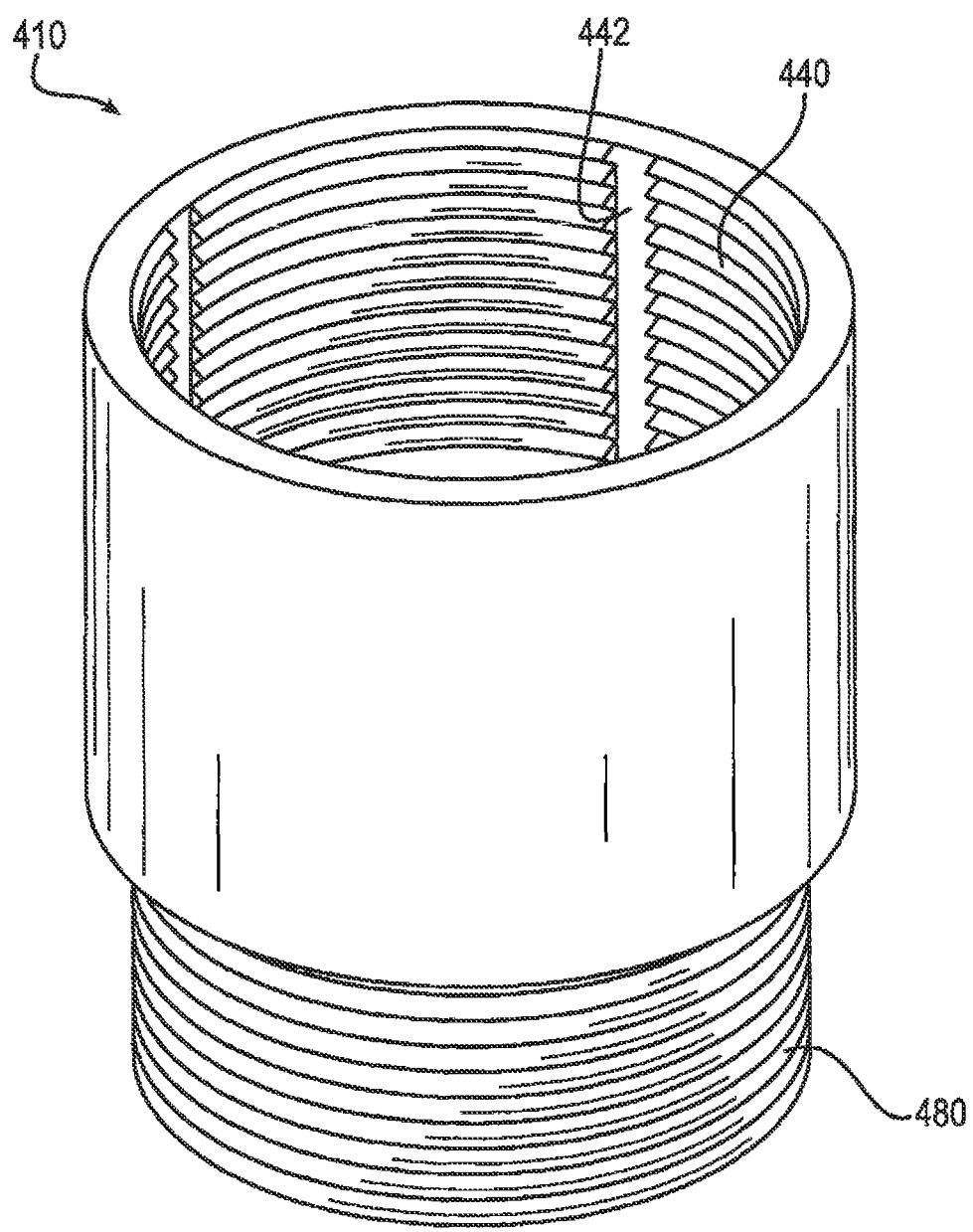
FIG. 9 shows an exemplary adapter for converting an exemplary filter head into a conventional filter head.
Figure 10:
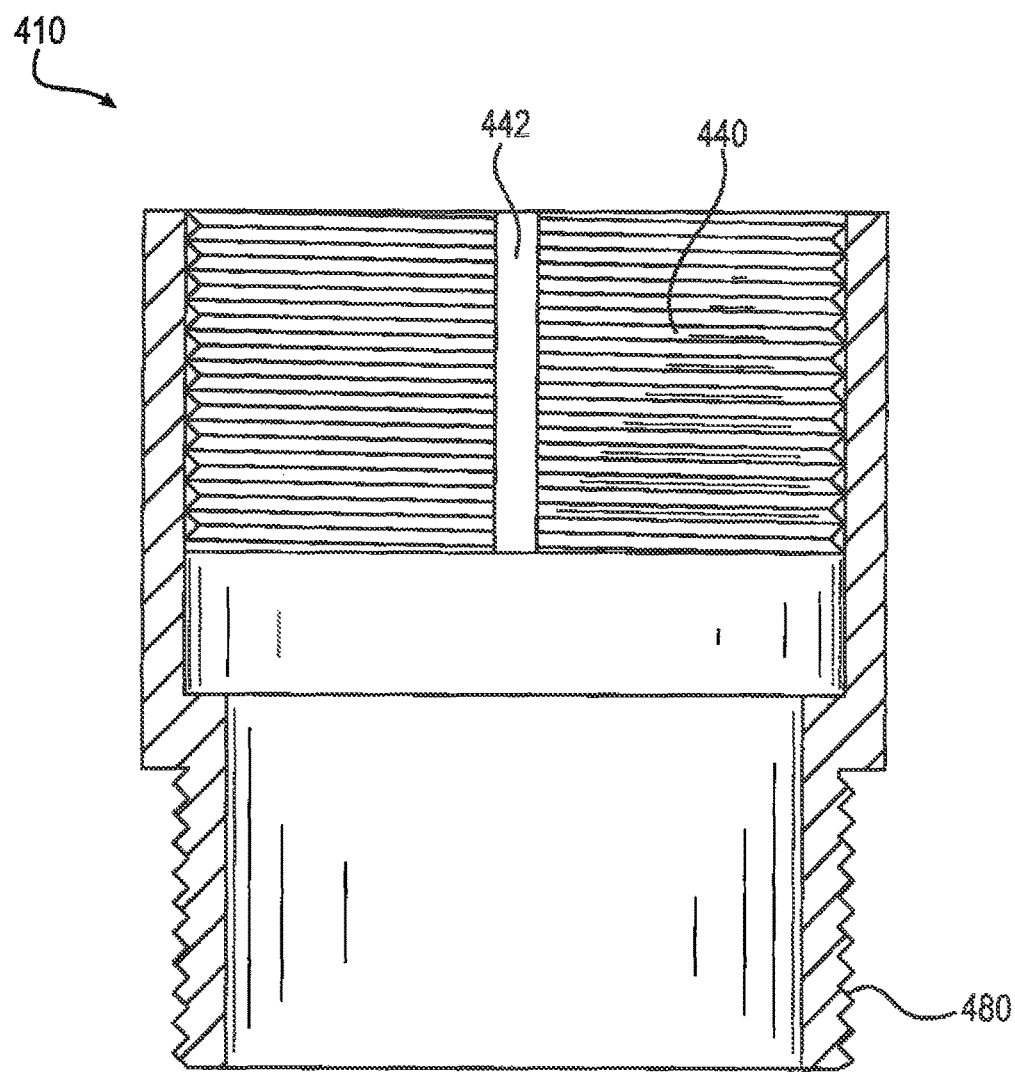
FIG. 10 shows a cross-section of the exemplary adapter for converting an exemplary filter head into a conventional filter head.

Referring now to FIGS. 9 and 10, shown is an exemplary filter head adapter 410 which may be provided to allow a conventional filter to be attached to an exemplary filter head. This adapter 410 includes a keyed connecting portion 440 with any of the characteristics described above with respect to the connection portions of exemplary filter elements. In particular, a keyed connection portion 440 enables the filter adapter to be spun-on to a complimentarily-threaded connection portion 140 of a filter head 110. The connection portion 440 of the adapter 410 includes at least one axially-extending slot 442 opening radially away from the connection portion.

Further, the adapter 410 includes a threaded filter connection portion 480 configured to allow a conventional filter to be spun-on to the filter adapter, and thus the filter head.

The exemplary filter connection portion 480 is shown as being axially offset from the keyed connection portion 440, although this need not be true, for example, in cases in which the filter to be spun-on is of a different size than the corresponding filter head connection. Further, the exemplary filter connection portion 480 is shown to be exteriorly-threaded while the keyed connection portion 440 is shown to be interiorly threaded, however, they may be switched, or both interiorly-threaded or both exteriorly-threaded, depending on the connection desired.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element, comprising:
a ring of filtration media circumscribing a central axis and defining a central cavity; and
an annular end cap sealingly bonded at an end of the media, the end cap including a central opening into the central cavity, and a lateral opening spaced laterally outward from the central opening, the central opening including a first, threaded connection portion to enable the element to be threadably connected to a complimentarily-threaded connection portion of a filter component, the first connection portion of the central opening including at least one angled slot extending at an angle offset from the central axis, and opening radially away from the first connection portion.

2. The filter element of claim 1, wherein the at least one angled slot extends from an axially-outer end of the first connection portion to an axially-inner end of the first connection portion.

3. The filter element of claim 1, wherein the at least one angled slot is at least two angled slots circumferentially spaced around the first connection portion.

4. The filter element of claim 1, wherein the first connection portion faces radially inward.

5. The filter element of claim 1, wherein the at least one angled slot is as radially deep as a maximum depth of threads on the first connection portion.

6. The filter element of claim 1, wherein the first threaded connection portion defines the central opening, and the at least one angled slot extends from an axially-outer end of the central opening to an axially-inner end of the central opening.

7. The filter element as in claim 1, wherein the at least one angled slot extends through the threads of the first connection portion.

8. A filter element, comprising:
a ring of filtration media circumscribing a central axis and defining a central cavity; and
an annular end cap sealingly bonded at an end of the media, the end cap including a central opening into the central cavity, and a lateral opening spaced laterally outward from the central opening, the central opening including a first, threaded connection portion to enable the element to be threadably connected to a complimentarily-threaded connection portion of a filter component, the first connection portion of the central opening including at least one angled slot opening radially away from the first connection portion, wherein the at least one angled slot forms at least a portion of a helix.

9. A filter assembly comprising:
i) a filter component having an annular connection portion defining a connection axis, and
ii) the filter element of claim 8, the first connection portion of the filter component including a threaded portion having complimentary threads to the first threaded connection portion of the central opening, and a lock portion axially outward of the threaded portion, the lock portion having at least one radially-projecting device sized so as to be received within at least one angled slot opening of the first connection portion, when the filter element is threadably connected to the filter head.

\* \* \* \* \*